United States Patent
Venkataramani et al.

(10) Patent No.: US 6,928,804 B2
(45) Date of Patent: Aug. 16, 2005

(54) PULSE DETONATION SYSTEM FOR A GAS TURBINE ENGINE

(75) Inventors: Kattalaicheri Srinivasan Venkataramani, West Chester, OH (US); Lawrence Butler, Cincinnati, OH (US); William Andrew Bailey, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 246 days.

(21) Appl. No.: 10/383,027

(22) Filed: Mar. 6, 2003

(65) Prior Publication Data

US 2004/0172950 A1 Sep. 9, 2004

(51) Int. Cl.[7] .............................. F02C 5/04; F02K 7/02
(52) U.S. Cl. ....................... 60/39.34; 60/39.76; 60/247
(58) Field of Search ............................ 60/39.34, 39.38, 60/39.76, 39.78, 247, 248, 249

(56) References Cited

U.S. PATENT DOCUMENTS

| | | | | | |
|---|---|---|---|---|---|
| 2,705,867 A | * | 4/1955 | Lewis | ........................ | 60/39.34 |
| 2,942,412 A | * | 6/1960 | Bollay | ......................... | 60/247 |
| 5,345,758 A | | 9/1994 | Bussing | ..................... | 60/39.38 |
| 5,901,550 A | | 5/1999 | Bussing et al. | ............ | 60/39.38 |
| 6,349,538 B1 | | 2/2002 | Hunter, Jr. et al. | ........... | 60/204 |
| 6,505,462 B2 | | 1/2003 | Meholic | .................... | 60/39.39 |
| 2004/0123582 A1 | * | 7/2004 | Norris et al. | .............. | 60/39.38 |

* cited by examiner

Primary Examiner—Louis J. Casaregola
(74) Attorney, Agent, or Firm—William Scott Andes; James P. Davidson (57) ABSTRACT

A pulse detonation system for a gas turbine engine having a longitudinal centerline axis extending therethrough, the pulse detonation system includes an air inlet duct in flow communication with a source of compressed air, the air inlet duct including at least one port formed therein for permitting compressed air to flow therethrough, a fuel injector mounted to the air inlet duct in circumferentially spaced relation to each port, and a device mounted to the air inlet duct in circumferentially spaced relation to each fuel injector for initiating a detonation wave. A rotatable ring member is also positioned in coaxial relation around a portion of the air inlet duct, with the ring member including at least one stage of detonation disposed therein. Accordingly, a detonation wave is produced in each detonation stage and combustion gases following each detonation wave create a torque which causes the ring member to rotate. Each detonation stage in the ring member further includes a plurality of circumferentially spaced detonation ducts extending tangentially from an inner surface of the ring member, wherein the detonation ducts are aligned with each port, the fuel injector and the initiation device in a predetermined timing and sequence so that detonation waves are produced therein.

30 Claims, 7 Drawing Sheets

PULSE DETONATION SYSTEM FOR A GAS TURBINE ENGINE

BACKGROUND OF THE INVENTION

The present invention relates generally to a pulse detonation system for a gas turbine engine and, in particular, to a pulse detonation system which is able to replace the core of a gas turbine engine without use of an externally actuated valve system.

It is well known that typical gas turbine engines are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such gas turbine engines generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are becoming increasingly costly to obtain.

Accordingly, improvements in engine efficiency have been obtained by operating the engine so that the combustion occurs as a detonation in either a continuous or pulsed mode. Most pulse detonation devices employ detonation tubes that are fed with a fuel/air mixture that is subsequently ignited. A combustion pressure wave is then produced, which transitions into a detonation wave (i.e., a fast moving shock wave closely coupled to the reaction zone). The products of combustion follow the detonation wave and are propagated at the speed of sound relative to the detonation wave while simultaneously providing a significant pressure rise. Such combustion products then exit through a nozzle to produce thrust. Examples of a pulse detonation engine are disclosed in U.S. Pat. No. 5,345,758 to Bussing and U.S. Pat. No. 5,901,550 to Bussing et al.

Simple pulse detonation engines have no moving parts with the exception of various forms of externally actuated valves. Such valves are used to control the duration of the fuel/air introduction and to prevent backflow of combustion products during the detonation process. An example of a rotary valve utilized for pulse detonation engines is disclosed in U.S. Pat. No. 6,505,462 to Meholic. While such pulse detonation configurations have advanced the state of the art, the valves and associated actuators are subjected to very high temperatures and pressures. This not only presents a reliability problem, but can also have a detrimental effect on the turbomachinery of the engine.

Accordingly, it would be desirable for a pulse detonation system to be developed for a gas turbine engine which is able to operate the engine without the need for a separate valve. Further, it would be desirable for such pulse detonation system to be adaptable to a gas turbine engine for both aeronautical and industrial applications so as to eliminate the core (i.e., a high pressure compressor, combustor, and high pressure turbine). It is also desirable that the pulse detonation system not cause stall or surge in the compression system supplying compressed air thereto.

BRIEF SUMMARY OF THE INVENTION

In a first exemplary embodiment of the invention, a pulse detonation system is disclosed for a gas turbine engine having a longitudinal centerline axis extending therethrough. The pulse detonation system includes an air inlet duct in flow communication with a source of compressed air, the air inlet duct including at least one port formed therein for permitting compressed air to flow therethrough, a fuel injector mounted to the air inlet duct in circumferentially spaced relation to each port, and a device mounted to the air inlet duct in circumferentially spaced relation to each fuel injector for initiating a detonation wave. A rotatable ring member is also positioned in coaxial relation around a portion of the air inlet duct, with the ring member including at least one stage of detonation disposed therein. Accordingly, detonation waves are produced in each detonation stage and combustion gases following each detonation wave create a torque which causes the ring member to rotate. Each detonation stage in the ring member further includes a plurality of circumferentially spaced detonation ducts extending tangentially from an inner surface of the ring member, wherein the detonation ducts are aligned with each port, fuel injector and initiation device in a predetermined timing and sequence so that the detonation wave is produced therein.

In a second exemplary embodiment of the invention, a method of providing power to a drive shaft in a gas turbine engine is disclosed as including the following steps: providing compressed air to an air inlet duct; providing a rotatable ring member in coaxial relation with the air inlet duct, the ring member including at least one stage of circumferentially spaced detonation ducts therein; connecting the ring member to the drive shaft; performing a detonation cycle in each detonation duct; and, producing a torque on the ring member which causes the ring member and the drive shaft to rotate. The detonation cycle further includes the steps of periodically supplying compressed air to the detonation ducts, subsequently injecting fuel into the detonation ducts, and subsequently initiating a detonation wave in the detonation ducts. The method further includes the step of aligning the detonation ducts of each detonation stage in a predetermined timing and sequence with an air port in the air inlet duct, a fuel injector in circumferentially spaced relation to the air port, and a device in circumferentially spaced relation to the fuel injector for initiating a detonation wave.

In accordance with a third embodiment of the invention, a gas turbine engine is disclosed as including a fan section at a forward end of the gas turbine engine including at least a first fan blade row connected to a drive shaft, a booster compressor positioned downstream of the fan section, where the booster compressor includes a first compressor blade row and a second blade row connected to the drive shaft and interdigitated with the first compressor blade row, and a pulse detonation system for powering the drive shaft. The pulse detonation system further includes an air inlet duct in flow communication with the booster compressor, where the air inlet duct includes at least one port formed therein for permitting compressed air to flow therethrough, a fuel injector mounted to the air inlet duct in circumferentially spaced relation to each port, and a device mounted to the air inlet duct in circumferentially spaced relation to each fuel injector for initiating a detonation wave. A rotatable ring member is also positioned in coaxial relation around a portion of the air inlet duct and connected to the drive shaft, with the ring member including at least one stage of detonation disposed therein. Accordingly, detonation waves are produced in each detonation stage such that combustion gases following the detonation waves create a torque which causes the ring member to rotate and power the fan section and the booster compressor. Each detonation stage further includes a plurality of circumferentially spaced detonation ducts extending tangentially from an inner surface of the ring member, wherein the detonation ducts are aligned with the port, fuel injector and initiation device in a predetermined timing and sequence so that a detonation cycle is performed therein.

In accordance with a fourth embodiment of the present invention, a gas turbine engine is disclosed as including a bellmouth at a forward end of the gas turbine engine, a compressor positioned downstream of and in flow communication with the bellmouth, where the compressor includes a first compressor blade row and a second blade row connected to a drive shaft and interdigitated with the first compressor blade row, a load connected to the drive shaft, and a pulse detonation system for powering the drive shaft. The pulse detonation system further includes an air inlet duct in flow communication with the booster compressor, where the air inlet duct includes at least one port formed therein for permitting compressed air to flow therethrough, a fuel injector mounted to the air inlet duct in circumferentially spaced relation to each port, and a device mounted to the air inlet duct in circumferentially spaced relation to each fuel injector for initiating a detonation wave. A rotatable ring member is also positioned in coaxial relation around a portion of the air inlet duct and connected to the drive shaft, with the ring member including at least one stage of detonation disposed therein. Accordingly, detonation waves are produced in each detonation stage such that combustion gases following the detonation waves create a torque which causes the ring member to rotate and power the compressor and the load. Each detonation stage further includes a plurality of circumferentially spaced detonation ducts extending tangentially from an inner surface of the ring member, wherein the detonation ducts are aligned with the port, the fuel injector and the initiation device in a predetermined timing and sequence so that a detonation cycle is performed therein.

DETAILED DESCRIPTION OF THE INVENTION

Figure 1:
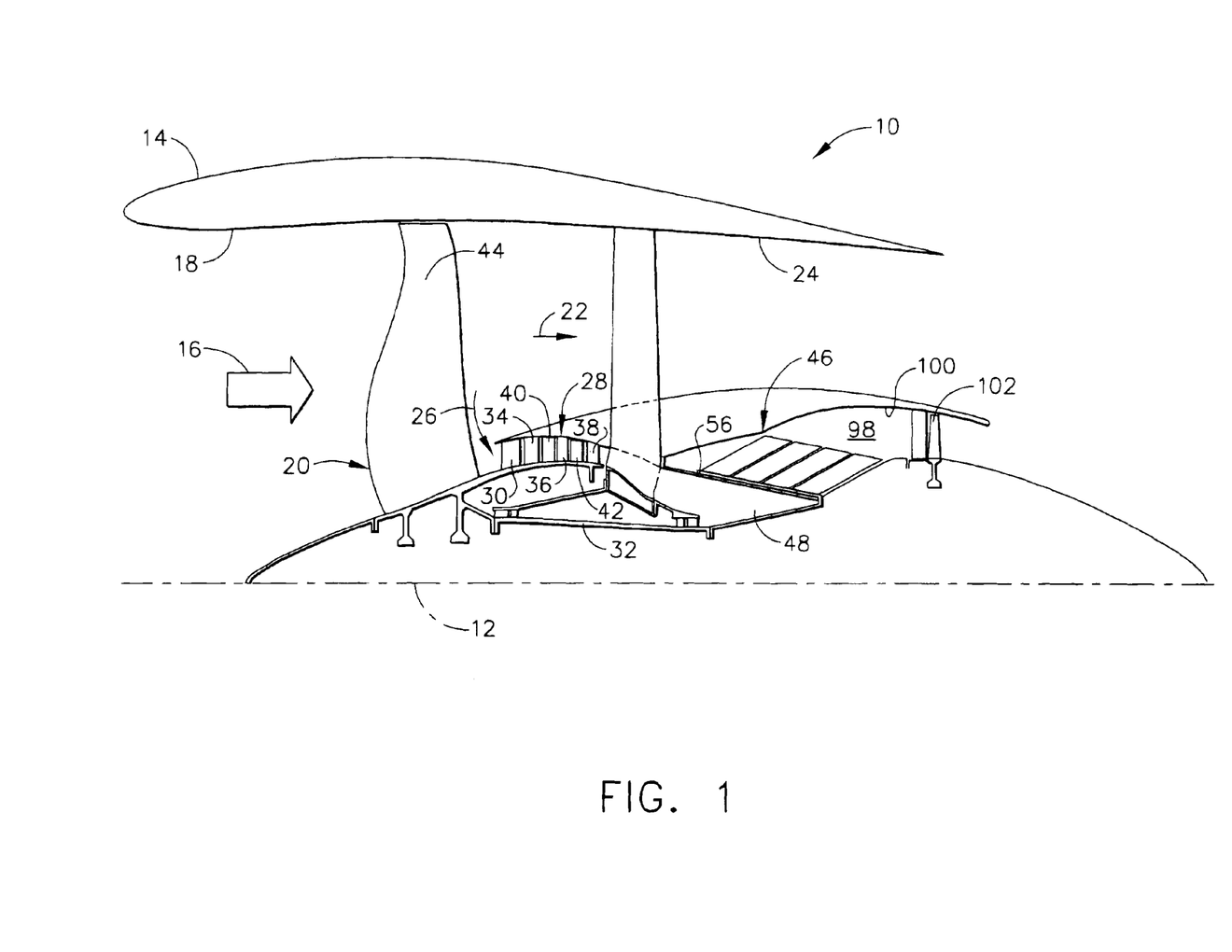
FIG. 1 is a longitudinal cross-sectional view of an aircraft gas turbine engine including a pulse detonation system in accordance with the present invention.

Referring now to the drawings in detail, wherein identical numerals indicate the same elements throughout the figures, FIG. 1 depicts an exemplary gas turbine engine 10 utilized with aircraft having a longitudinal or axial centerline axis 12 therethrough for reference purposes. Gas turbine engine 10 includes a nacelle 14 to assist in directing a flow of air (represented by arrow 16) through an inlet 18 to a fan section 20 as is well known. Air flow 16 is then split downstream of fan section 20 so that a first portion (represented by arrow 22) flows through an outer duct 24 and a second portion (represented by arrow 26) is provided to a booster compressor 28. It will be understood that booster compressor 28 preferably includes at least a first compressor blade row 30, which preferably is stationary, and a second compressor blade row 34 connected to a drive shaft 32 and interdigitated with first compressor blade row 30. It will be appreciated that additional compressor blade rows 36 and 38 may also be connected to drive shaft 32, with additional stationary compressor blade rows 40 and 42 being interdigitated therewith, respectively. A first fan blade row 44 is also preferably connected to drive shaft 32. Drive shaft 32 is powered by means of a pulse detonation system 46 in accordance with the present invention.

Figure 5:
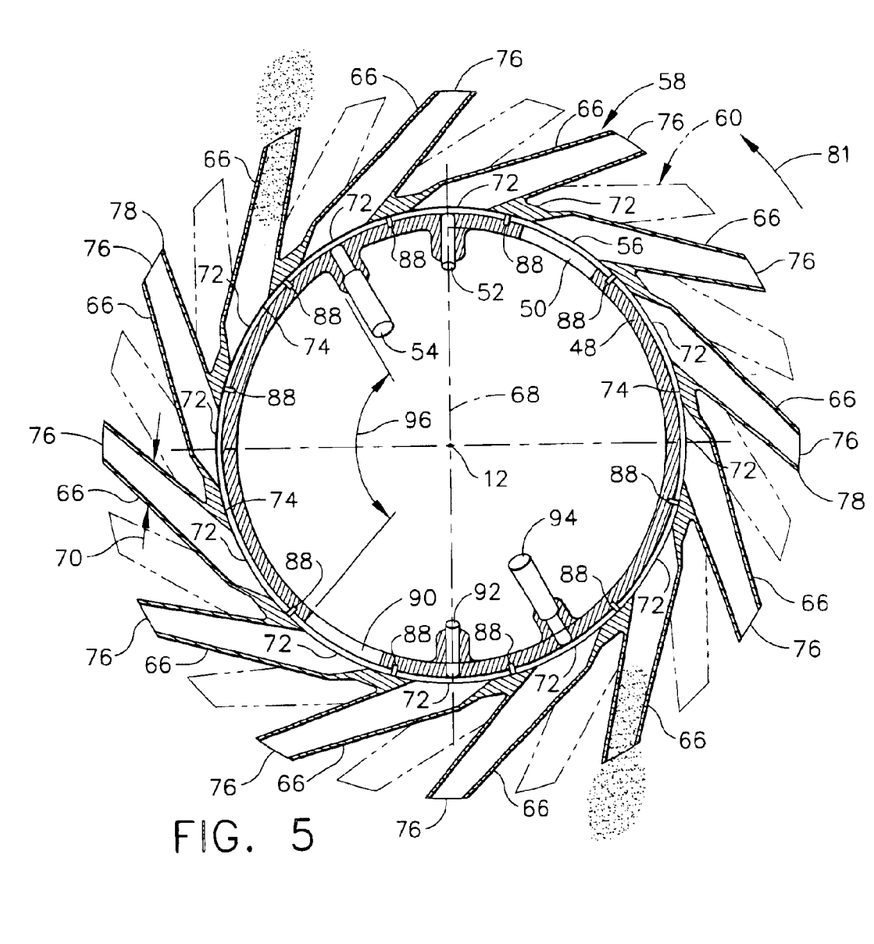
FIG. 5 is a sectional view of the pulse detonation device depicted in FIGS. 1–4 taken along line 5—5 in FIG. 4, where detonation ducts of an adjacent detonation stage are shown in phantom as being staggered circumferentially with detonation ducts of a first detonation stage.

More specifically, pulse detonation system 46 includes an air inlet duct 48 which is positioned so as to be in flow communication with booster compressor 28. As best seen in FIG. 5, air inlet duct 48 includes at least one port 50 formed therein for permitting compressed air received from booster compressor 28 to flow therethrough. In addition, a fuel injector 52 is mounted to air inlet duct 48 in circumferentially spaced relation to each port 50 and a device 54 is mounted to air inlet duct 48 in circumferentially spaced relation to each fuel injector 52 for initiating detonation waves. It will be appreciated that initiation device 54 may include, for example, an igniter (e.g., a high energy spark plug, a torch igniter having separate fuel and oxidizer, or a plasma jet igniter), a laser, or a shock focus device.

A rotatable ring member 56 is positioned in coaxial relation (with respect to centerline longitudinal axis 12) around a portion of air inlet duct 48. Ring member 56 includes at least one stage 58 of detonation disposed therein, although additional detonation stages 60, 62 and 64 are preferably provided therein in spaced axial relation downstream of detonation stage 58 depending upon the thrust requirements of engine 10. Such staging arrangement also accommodates the turn-down ratio in fuel required for the application while staying within the region bounded by lean and rich detonability limits. Each detonation stage preferably has a plurality of circumferentially spaced detonation ducts 66 extending tangentially from an inner surface 74 of ring member 56 in a distinct radial plane. It is also preferred that ring member 56 be hollow between each adjacent detonation ducts 66 so as to reduce weight, thereby giving detonation ducts 66 a tube-like appearance. In order to provide added stability, various connections may be provided between adjacent detonation ducts 66. An alternative configuration may involve a ring member having tubes attached to an outer surface thereof.

Figure 6:
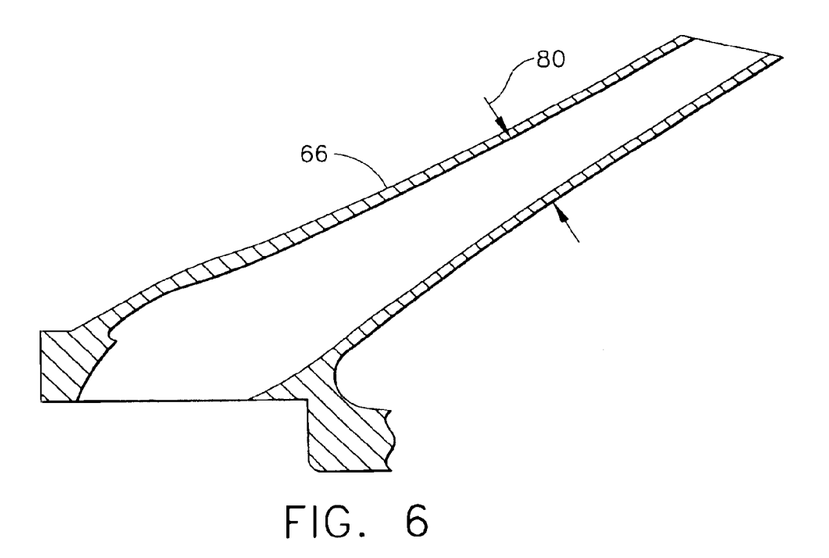
FIG. 6 is a partial sectional view of an alternate detonation duct configuration for the pulse detonation system depicted in FIGS. 1–5.
Figure 7:
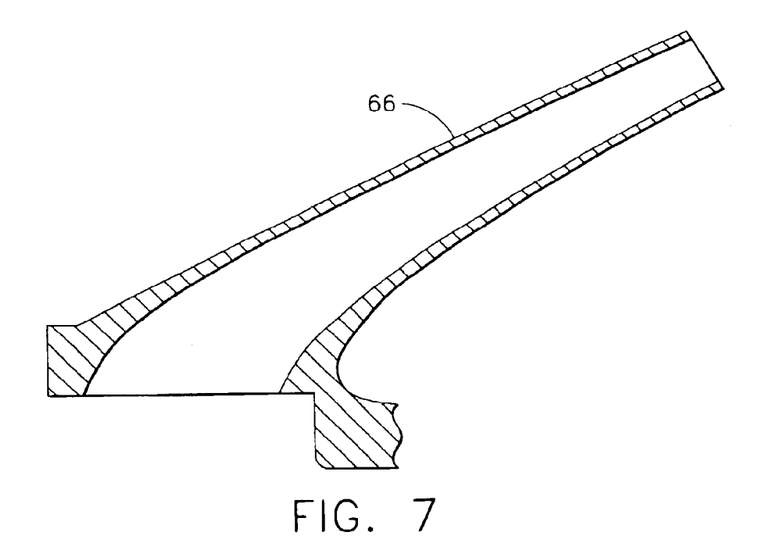
FIG. 7 is a partial sectional view of a second alternate detonation duct configuration for the pulse detonation system depicted in FIGS. 1–5; and, FIG. 8 is a longitudinal cross-sectional view of an industrial gas turbine engine including a pulse detonation system in accordance with the present invention.

It will be understood that while detonation ducts 66 of each detonation stage 58, 60, 62 and 64 may be oriented substantially perpendicular to and offset from longitudinal centerline axis 12, it is preferred that detonation ducts 66 be angled rearward with respect to an axis 68 substantially perpendicular to longitudinal centerline axis 12. In this way, the flow of combustion gases exiting detonation ducts 66 is able to provide a forward thrust component while minimizing turning losses. In an alternative configuration (see FIG. 7), detonation ducts 66 may be curved for at least a portion thereof. It will also be seen that each detonation duct extends from a first end or inlet 72 adjacent an inner surface 74 of ring member 56 to a second end or outlet 76 adjacent an outer surface 78 of ring member 56. It will be appreciated that inlet 72 is somewhat larger due to the tangential arrangement of detonation ducts 66 to ring member inner surface 74 and the relative motion between ring member 56 and air inlet duct 48. Nevertheless, each detonation duct 66 is preferably linear with a substantially circular cross-section having a substantially constant diameter 70 after inlet 72 to outlet 76. As depicted in FIG. 6, however, each detonation duct 66 may have a substantially convergent diameter 80 for at least a portion thereof to accomplish quick transition to detonation. Of course, the geometry of detonation ducts 66 may be tailored for the particular application (i.e., depending on the type of fuel used) or other constraints due to space or weight.

Detonation ducts 66 for each detonation stage 58, 60, 62 and 64 may also be substantially aligned circumferentially when viewed along longitudinal centerline axis 12. While this configuration may ease manufacture and maintenance, it is contemplated that staggering of such detonation ducts 66 circumferentially between detonation stages 58, 60, 62 and 64 (as depicted in phantom in FIG. 5 with respect to detonation stages 58 and 60) may assist in reducing the noise generated by pulse detonation system 46.

Figure 2:
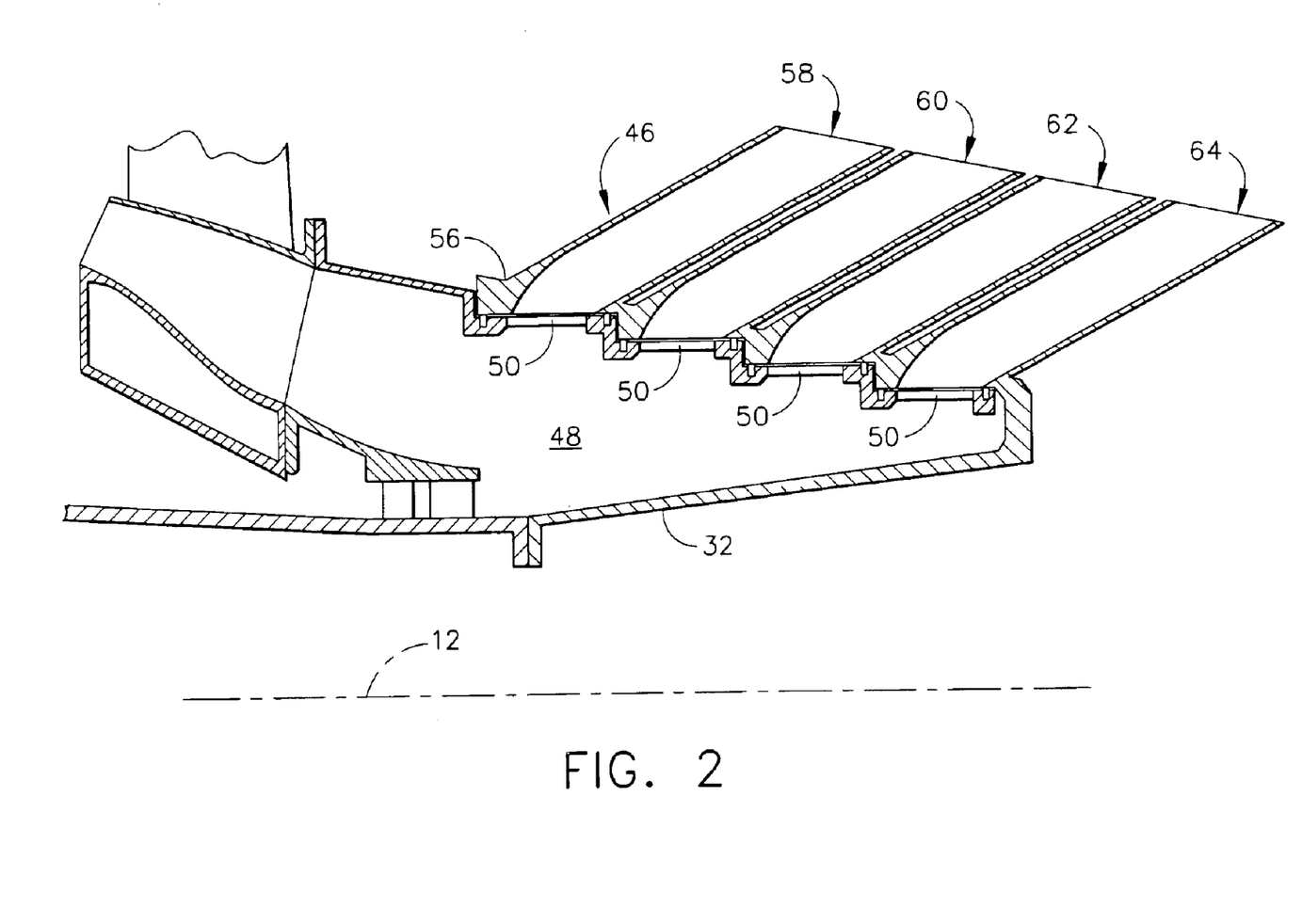
FIG. 2 is an enlarged, partial longitudinal cross-sectional view of the gas turbine engine depicted in FIG. 1, wherein delivery of compressed air to the pulse detonation system is shown.
Figure 4:
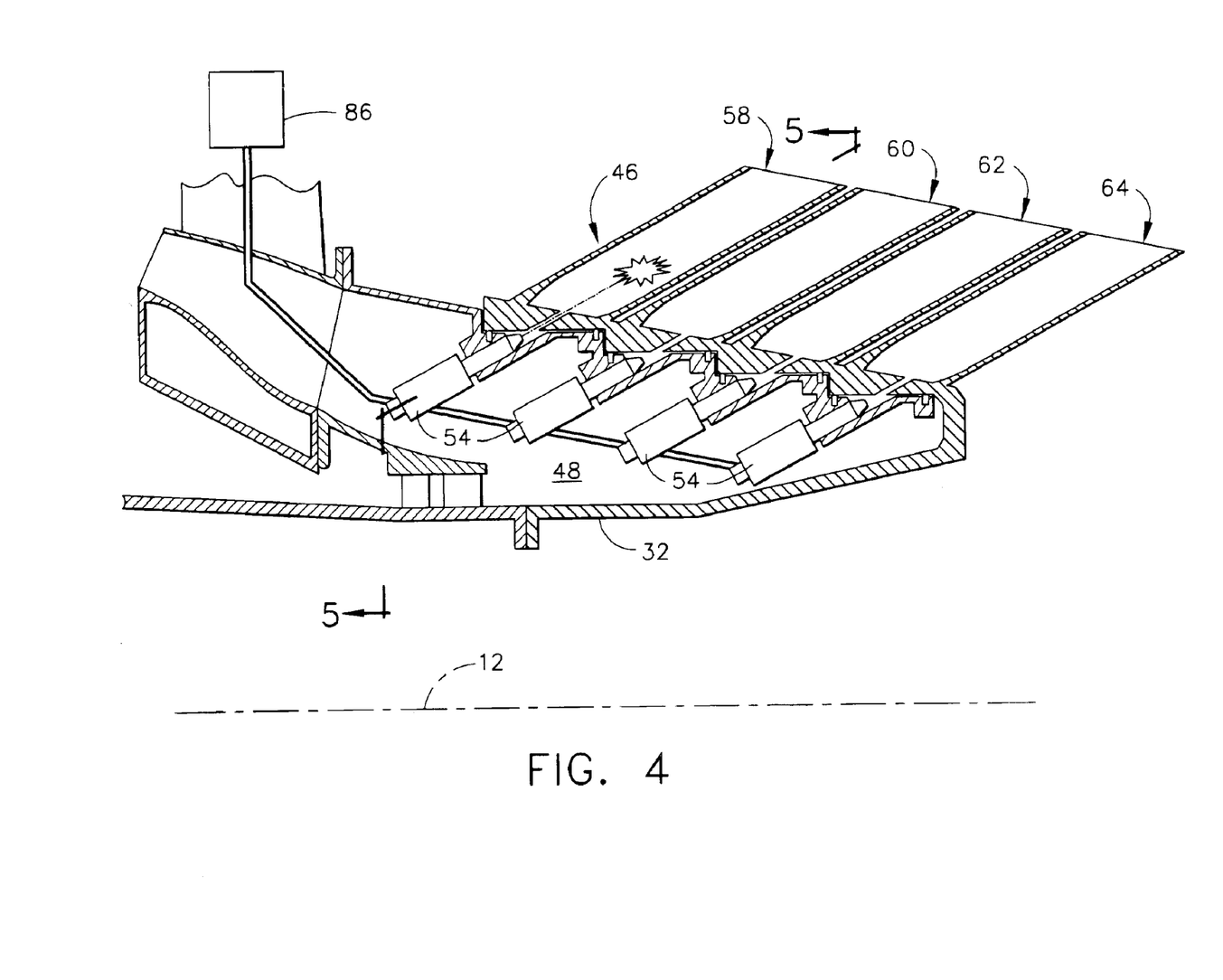
FIG. 4 is an enlarged, partial longitudinal cross-sectional view of the gas turbine engine depicted in FIG. 1, wherein initiation of a detonation wave in the pulse detonation system is shown.

Regardless of the configuration utilized for detonation ducts 66, it will be appreciated that detonation ducts 66 of each detonation stage 58, 60, 62, and 64 are aligned with air port 50 (see FIG. 2), fuel injector 52 (see FIG. 4), and initiation device 54 (see FIG. 5) in a predetermined timing and sequence so that a detonation wave is produced therein. This is also evidenced by the direction of rotation for ring member 56, as represented by arrow 81 in FIG. 5. Combustion gases then follow each detonation wave, the momentum of which produces a force that creates a torque on ring member 56 due to the eccentric orientation of detonation ducts 66. This torque causes ring member 56 to rotate. Prior to the detonation cycle taking place (i.e., the injection of fuel and initiation of a detonation wave in detonation ducts 66), however, it is preferred that ring member 56 rotate at a predetermined speed. This is caused by the compressed air being supplied to detonation ducts 66 through air port 50. It is also preferred that detonation ducts 66 not be in communication with air inlet duct 48 while detonation (and the consequent pressure rise) occurs therein. In this way, booster compressor 28 and fan section 20 are isolated from the high pressure therein and thereby avoids stall or surge.

Figure 3:
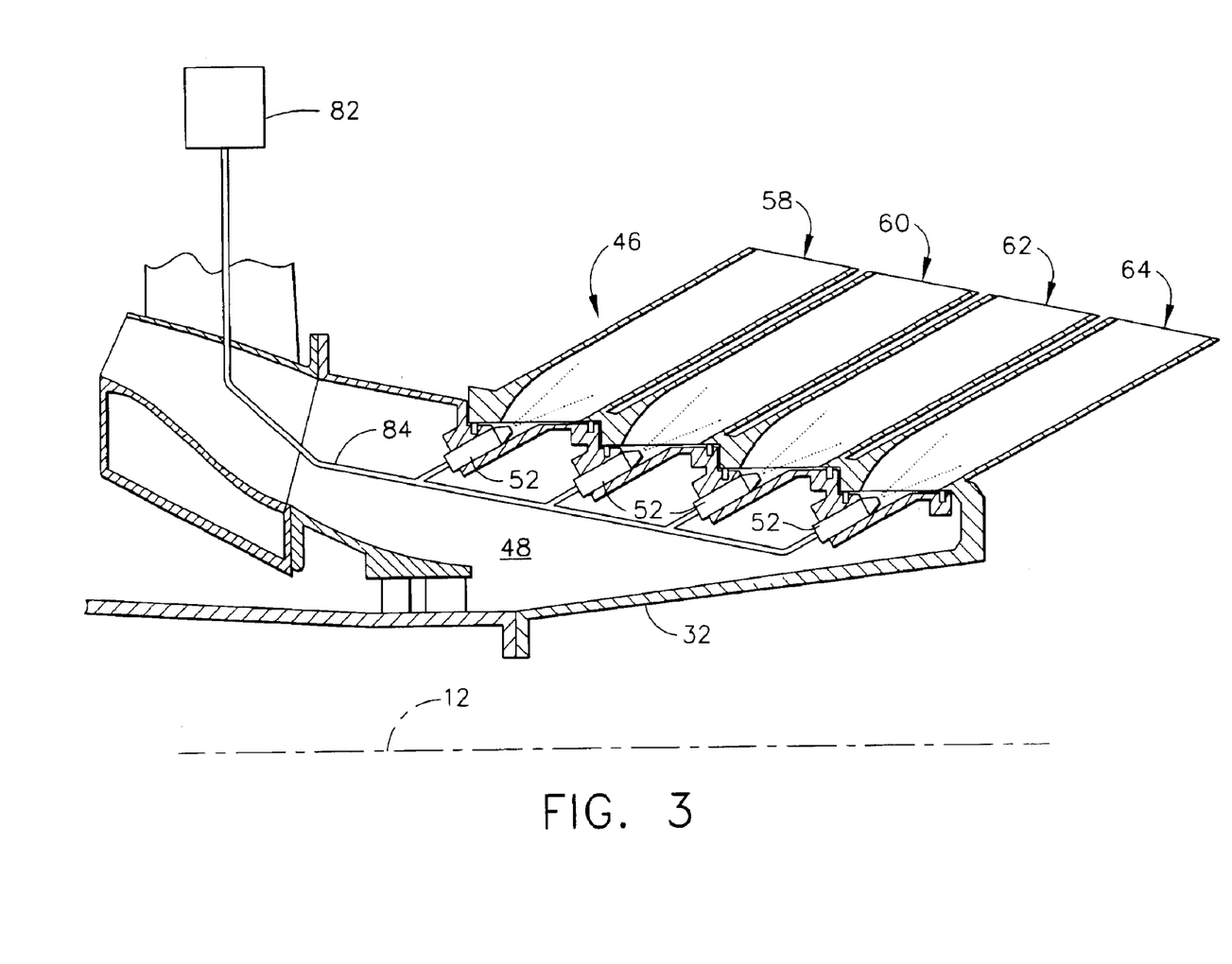
FIG. 3 is an enlarged, partial longitudinal cross-sectional view of the gas turbine engine depicted in FIG. 1, wherein delivery of fuel to the pulse detonation system is shown.

It will be appreciated that compressed air will preferably be supplied in each detonation duct 66, but that fueling and/or initiation of a detonation wave may or may not occur in each successive detonation duct 66 depending upon the power required from pulse detonation system 46 and whether a buffer or delay is desired between detonations. Accordingly, a device 82 is preferably provided to control the supply of fuel through a manifold 84 to fuel injectors 52 (see FIG. 3). A device 86 is also preferably provided for controlling the initiation of detonation waves in detonation ducts 66 by initiation device 54 (see FIG. 4).

In order to prevent compressed air or fuel from leaking between adjacent detonation ducts 66, a plurality of seals 88 (e.g., floating rubbing contact seals) are preferably positioned between air inlet duct 48 and inner surface 74 of ring member 56.

It is also preferred that a plurality of detonation cycles occur in each detonation duct 66 of detonation stages 58, 60, 62 and 64. Accordingly, at least one additional sequence of an additional air port 90 circumferentially spaced from initiation device 54, an additional fuel injector 92 circumferentially spaced from air port 90, and an additional device 94 circumferentially spaced from fuel injector 92 for initiating detonation waves are provided in or mounted to air inlet duct 48. It will be appreciated that a designated circumferential spacing 96 is provided between additional air port 90 and initiation device 54 so as to provide substantial symmetry between detonation sequences in any detonation stage. Of course, this will be dependent upon the overall number of detonation sequences (with the associated air port, fuel injector and ignition device) provided in a given detonation stage.

As seen in FIG. 1 with respect to gas turbine engine 10, a nozzle plenum 98 is preferably positioned with respect to ring member 56 (and outlets 76 of detonation ducts 66) so as to be in flow communication with the combustion gases exiting therefrom. In this way, additional thrust is produced through an exit nozzle 100. Further, at least one turbine stage 102 may be positioned in flow communication with nozzle plenum 98. Such turbine stage 102 may be connected to drive shaft 32 or another drive shaft so as to produce additional thrust or work.

Figure 8:
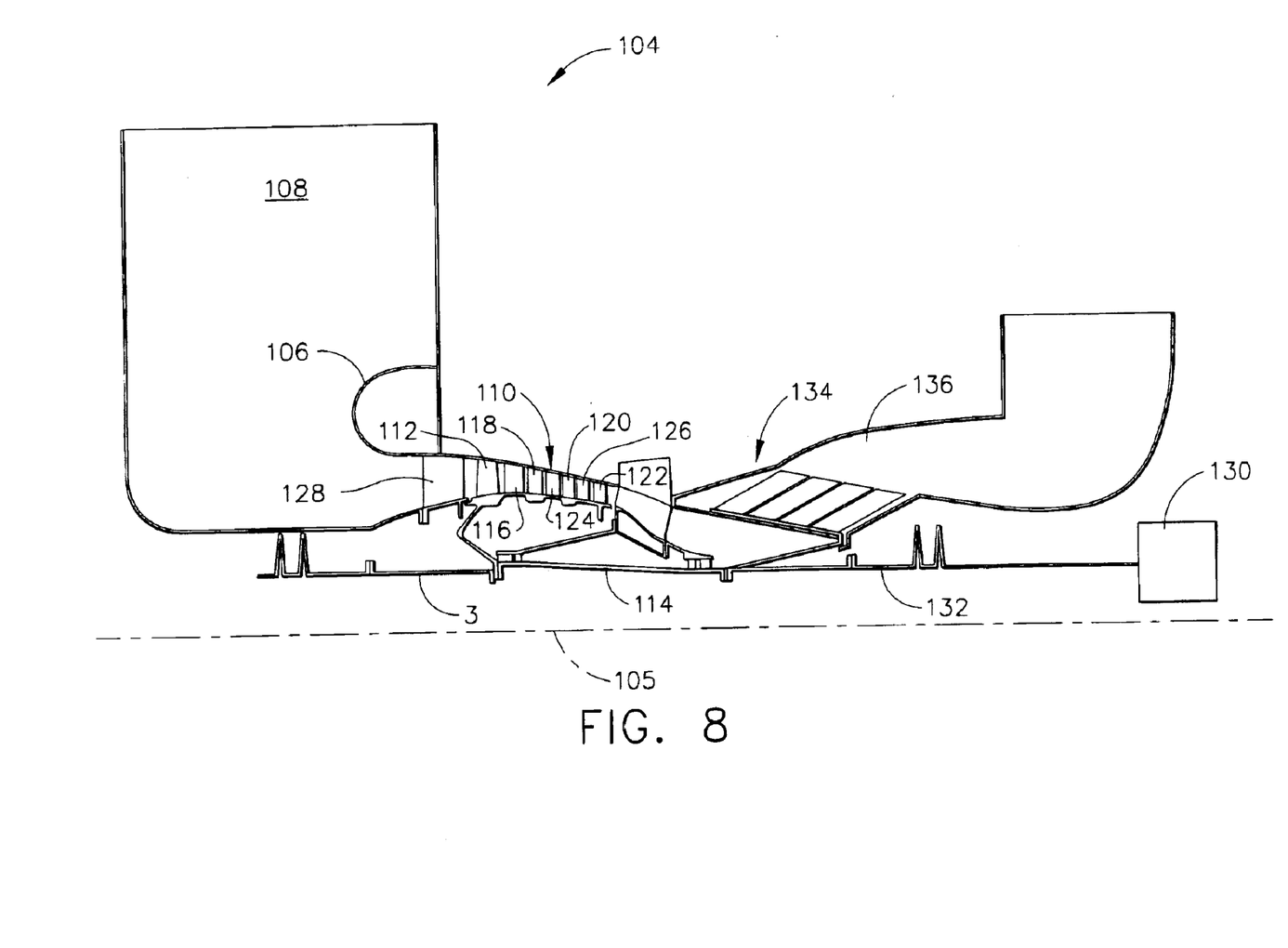

It will be seen in FIG. 8 that an alternative gas turbine engine 104 is depicted for use in industrial and other shaft power applications (e.g., marine or helicopter propulsion) as having a longitudinal centerline axis 105. As seen therein, gas turbine engine 104 includes a bellmouth 106 at an inlet 108 and a compressor 110 positioned downstream of and in flow communication with bellmouth 106. Compressor 110 includes at least a first compressor blade row 112 connected to a drive shaft 114 and a second stationary compressor blade row 116 interdigitated with first compressor blade row 112. Additional compressor blade rows 118, 120 and 122 may be connected to drive shaft 114, with additional stationary compressor blade rows 124 and 126 interdigitated therewith, respectively. An inlet guide vane 128 may be positioned at an upstream end of compressor 110 to direct the flow of air therein. A load 130 is also connected to drive shaft 114 via a second drive shaft 132. A pulse detonation system 134 like that described hereinabove is provided for powering drive shaft 114, with an exhaust duct 136 being in flow communication with pulse detonation system 134 so that combustion gases are able to exit therefrom.

In accordance with the description of pulse detonation systems 46 and 134 for gas turbine engines 10 and 104, respectively, it will be appreciated that a method of providing power to a drive shaft in a gas turbine engine is also associated therewith. Such method, with respect to gas turbine engine 10, includes the steps of providing compressed air to an air inlet duct 48 and providing a rotatable ring member 56 in coaxial relation with air inlet duct 48. Ring member 56 includes at least one stage 58, 60, 62 and 64 of circumferentially spaced detonation ducts 66 therein. Another step of the method is connecting ring member 56 to a drive shaft 32. Thereafter, a detonation cycle is performed in each detonation duct 66 in order to produce a torque which causes ring member 56 and drive shaft 32 to rotate. Performance of the detonation cycle further includes the steps of periodically supplying compressed air to detonation ducts 66, subsequently injecting fuel into detonation ducts 66, and subsequently initiating a detonation wave in detonation ducts 66. These steps involve aligning detonation ducts 66 of each detonation stage 58, 60, 62 and 64 in a predetermined timing and sequence with an air port 50 in air inlet duct 48, a fuel injector 52 in circumferentially spaced relation to air port 50, and a device 54 in circumferentially spaced relation to fuel injector 52 for initiating a detonation wave.

Having shown and described the preferred embodiment of the present invention, further adaptations of the pulse detonation system can be accomplished by appropriate modifications by one of ordinary skill in the art without departing from the scope of the invention. Moreover, it will be understood that various configurations of detonation stages and detonation ducts, as well as the number and spacing of such detonation stages and detonation ducts, is within the scope of the present invention.

What is claimed is:

1. A pulse detonation system for a gas turbine engine having a longitudinal centerline axis extending therethrough, comprising:
   (a) an air inlet duct in flow communication with a source of compressed air, said air inlet duct including at least one port formed therein for permitting compressed air to flow therethrough;
   (b) a fuel injector mounted to said air inlet duct in circumferentially spaced relation to each said port;
   (c) a device mounted to said air inlet duct in circumferentially spaced relation to each said fuel injector for initiating a detonation wave; and,
   (d) a rotatable ring member positioned in coaxial relation around a portion of said air inlet duct, said ring member including at least one stage of detonation disposed therein;
   wherein detonation waves are produced in each said detonation stage and combustion gases following each said detonation wave create a torque which causes said ring member to rotate.

2. The pulse detonation system of claim 1, each said detonation stage in said ring member further comprising a plurality of circumferentially spaced detonation ducts extending tangentially from an inner surface of said ring member.

3. The pulse detonation system of claim 2, wherein said detonation ducts are aligned with each said port, said fuel injector and said initiation device in a predetermined timing and sequence so that said detonation wave is produced therein.

4. The pulse detonation system of claim 2, wherein said plurality of detonation ducts for each said detonation stage are positioned in a distinct radial plane.

5. The pulse detonation system of claim 2, wherein said plurality of detonation ducts in each said detonation stage are aligned circumferentially with said detonation ducts of an adjacent detonation stage.

6. The pulse detonation system of claim 2, wherein said plurality of detonation ducts in each said detonation stage are staggered circumferentially with said detonation ducts of an adjacent detonation stage.

7. The pulse detonation system of claim 2, wherein said plurality of detonation ducts of each said detonation stage are angled rearward with respect to an axis substantially perpendicular to said longitudinal centerline axis.

8. The pulse detonation system of claim 2, wherein said plurality of detonation ducts of each said detonation stage are oriented substantially perpendicular to and offset from said longitudinal centerline axis.

9. The pulse detonation system of claim 2, wherein said plurality of detonation ducts of each said detonation stage have a substantially constant diameter for at least a portion thereof.

10. The pulse detonation system of claim 2, wherein said plurality of detonation ducts of each said detonation stage have a substantially convergent diameter for at least a portion thereof.

11. The pulse detonation system of claim 2, wherein said plurality of detonation ducts of each said detonation stage are substantially linear from a first end adjacent an inner surface of said rotatable ring member to a second end adjacent an outer surface of said rotatable ring member.

12. The pulse detonation system of claim 2, wherein said plurality of detonation ducts of each said detonation stage are curved for at least a portion thereof.

13. The pulse detonation system of claim 1, wherein said rotatable ring member is hollow between said plurality of detonation ducts.

14. The pulse detonation system of claim 1, said rotatable ring member further comprising a plurality of detonation stages positioned in spaced axial relation.

15. The pulse detonation system of claim 1, further comprising a plurality of seals positioned between said air inlet duct and an inner surface of said rotatable ring member.

16. The pulse detonation system of claim 1, further comprising a fuel manifold for supplying fuel to each said fuel injector.

17. The pulse detonation system of claim 2, wherein each said initiation device is activated when in alignment with each detonation duct of each said detonation stage.

18. The pulse detonation system of claim 2, wherein each said initiation device is activated in accordance with a predetermined delay between detonation ducts of each said detonation stage.

19. The pulse detonation system of claim 2, further comprising a device for controlling the injection of fuel into said detonation ducts of each said detonation stage by said fuel injectors.

20. The pulse detonation system of claim 2, further comprising a device for controlling the initiation of detonation waves in said detonation ducts of each said detonation stage by said initiation devices.

21. The pulse detonation system of claim 1, further comprising a plurality of air ports, fuel injectors and initiation devices provided in and mounted to said air inlet duct.

22. The pulse detonation system of claim 21, said air inlet duct including a predetermined amount of circumferential space between each said initiation device and an adjacent port for permitting compressed air to flow therethrough.

23. The pulse detonation system of claim 21, wherein a plurality of detonation cycles in a predetermined timing and sequence occur in each said detonation stage during a revolution of said ring member.

24. A gas turbine engine, comprising:
   (a) a fan section at a forward end of said gas turbine engine including at least a first fan blade row connected to a drive shaft;
   (b) a booster compressor positioned downstream of said fan section, said booster compressor including a first compressor blade row and a second compressor blade row connected to said drive shaft and interdigitated with said first compressor blade row; and,
   (c) a pulse detonation system for powering said drive shaft, said pulse detonation system further comprising:
      (1) an air inlet duct in flow communication with said booster compressor, said air inlet duct including at least one port formed therein for permitting compressed air to flow therethrough;
      (2) a fuel injector mounted to said air inlet duct in circumferentially spaced relation to each said port;

(3) a device mounted to said air inlet duct in circumferentially spaced relation to each said fuel injector for initiating a detonation wave; and, (4) a rotatable ring member positioned in coaxial relation around a portion of said air inlet duct and connected to said drive shaft, said ring member including at least one stage of detonation disposed therein;

wherein detonation waves are produced in each said detonation stage such that combustion gases following said detonation waves create a torque which causes said ring member to rotate and power said fan section and said booster compressor.

25. The gas turbine engine of claim 24, each said detonation stage further comprising a plurality of circumferentially spaced detonation ducts extending tangentially from a an inner surface of said ring member.

26. The gas turbine engine of claim 25, wherein said detonation ducts are aligned with said port, said fuel injector and said initiation device in a predetermined timing and sequence so that a detonation cycle is performed therein.

27. The gas turbine engine of claim 25, wherein said detonation ducts of each said detonation stage are located within a distinct radial plane.

28. The gas turbine engine of claim 24, said rotatable ring member further comprising a plurality of detonation stages positioned in spaced axial relation.

29. The gas turbine engine of claim 25, further comprising a nozzle plenum in flow communication with outlets of said detonation ducts so that additional thrust is produced.

30. The gas turbine engine of claim 29, further comprising at least one turbine stage in flow communication with said nozzle plenum.

* * * * *